(12) United States Patent
Gomyo et al.

(10) Patent No.: US 6,789,185 B1
(45) Date of Patent: Sep. 7, 2004

(54) INSTRUCTION CONTROL APPARATUS AND METHOD USING MICRO PROGRAM

(75) Inventors: Norihito Gomyo, Kanagawa (JP); Aiichiro Inoue, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/460,457

(22) Filed: Dec. 13, 1999

(30) Foreign Application Priority Data

Dec. 17, 1998 (JP) .......................................... 10-358611

(51) Int. Cl.[7] .............................................. G06F 9/22
(52) U.S. Cl. ...................................... 712/217; 712/211
(58) Field of Search ................................ 712/211, 217

(56) References Cited

U.S. PATENT DOCUMENTS

| | | | | |
|---|---|---|---|---|
| 5,838,940 A | * | 11/1998 | Savkar et al. ................ | 712/216 |
| 5,987,587 A | * | 11/1999 | Meltzer ........................ | 712/23 |
| 6,304,953 B1 | * | 10/2001 | Henstrom et al. ........... | 712/215 |
| 6,502,186 B2 | * | 12/2002 | Inoue ........................... | 712/217 |

FOREIGN PATENT DOCUMENTS

| | | |
|---|---|---|
| JP | 8-263289 | 10/1996 |
| JP | 7-84965 | 6/1998 |
| JP | 10-154072 | 6/1998 |
| JP | 2000-020306 | 1/2000 |

OTHER PUBLICATIONS

Chappell et al., "Simultaneous Subordinate Microthreading (SSMT)", Proceedings of the 26th International Symposium on Computer Architecture, IEEE, pp. 186–195, May 2, 1999–May 4, 1999.*

Communication for the corresponding Japanese patent application, dated Nov. 4, 2003.

* cited by examiner

Primary Examiner—William M. Treat
(74) Attorney, Agent, or Firm—Staas & Halsey LLP

(57) ABSTRACT

A control reservation station stores the control information of a micro program to control one or more flows of an instruction process and controls each flow using the control information. A data buffer stores data to be used to control each flow and outputs the data at an appropriate timing.

15 Claims, 14 Drawing Sheets

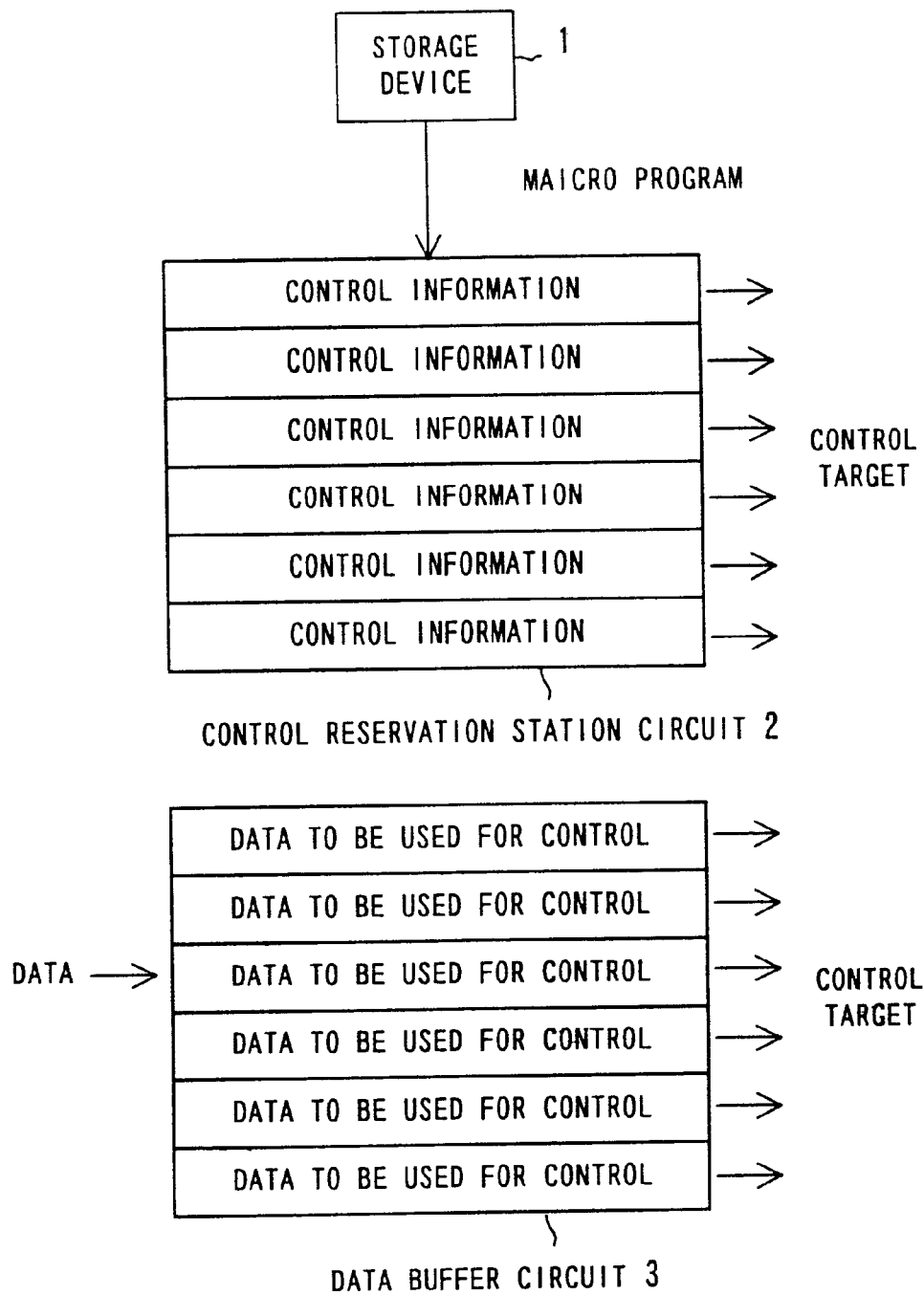
F I G. 1

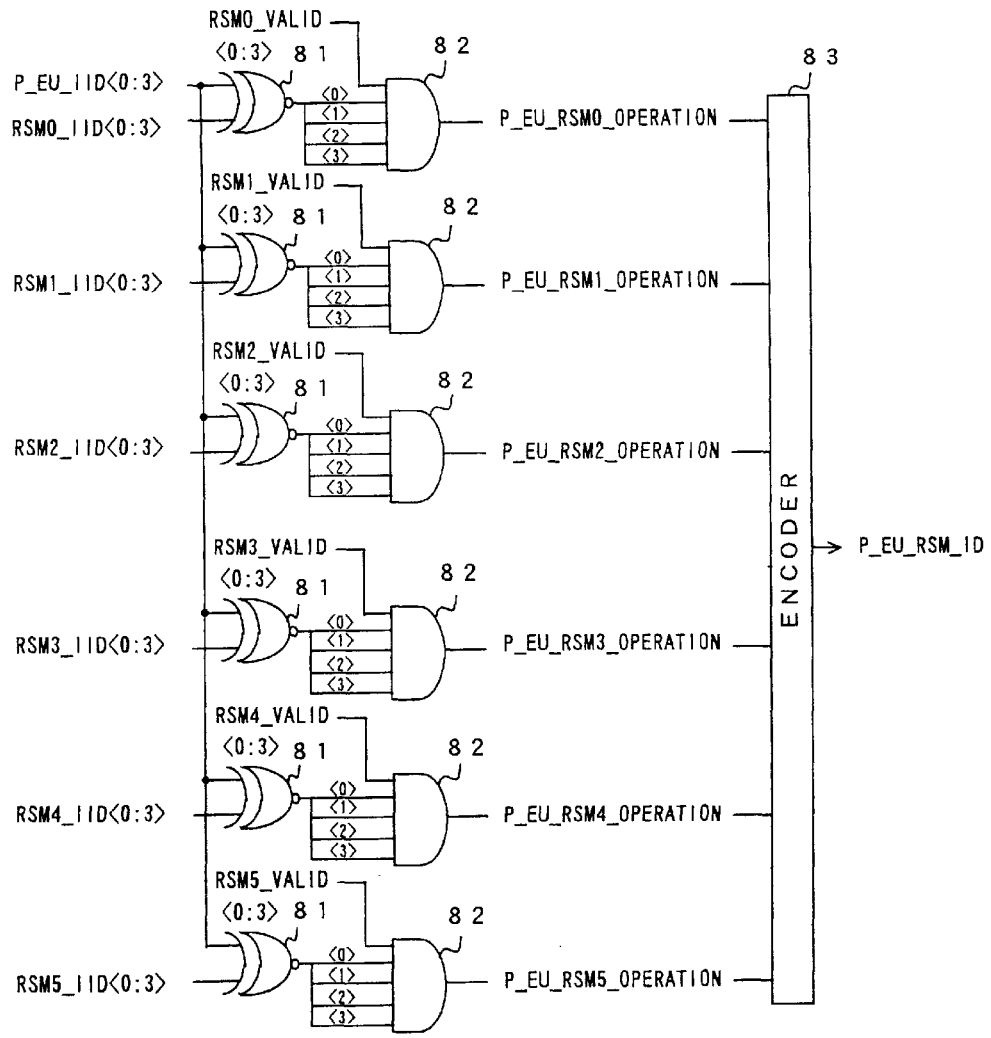
F I G. 8

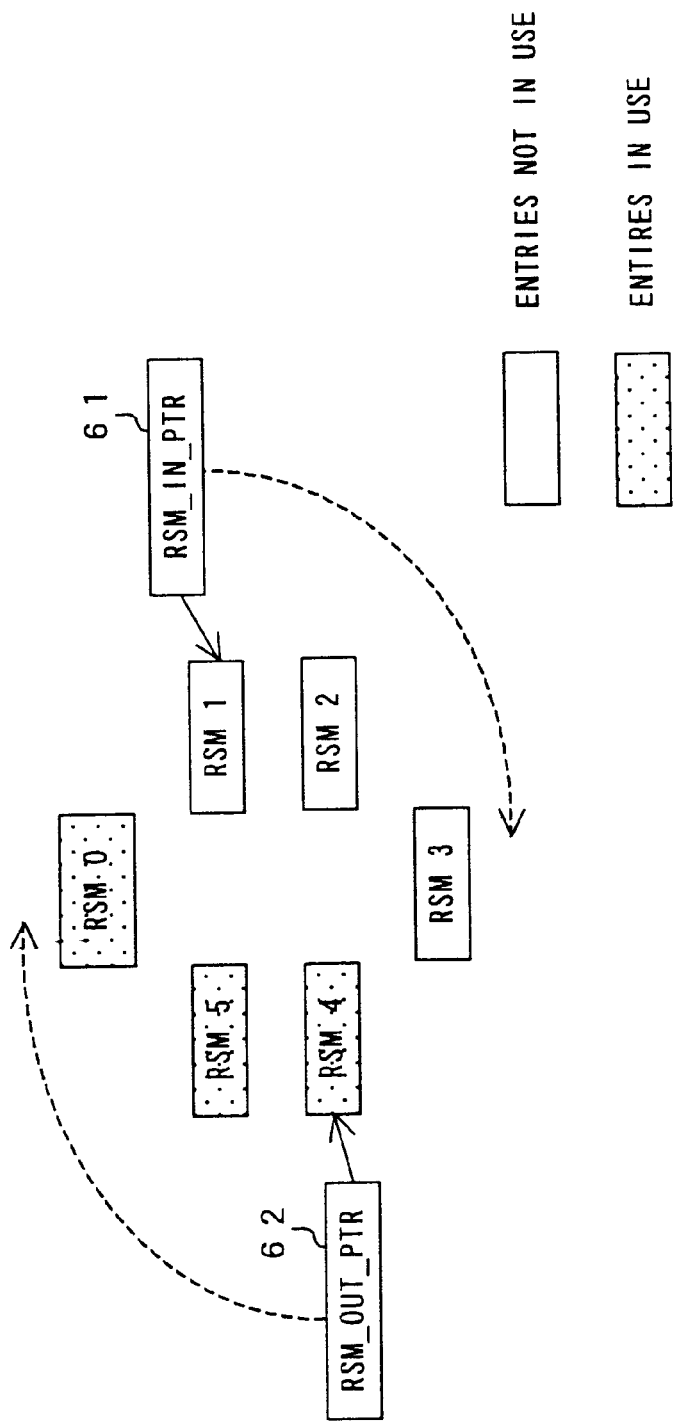
F I G. 9

1 st flow :

no operation 2 st flow :

no operation 3 rd flow : PSW<0:31> LOAD $D_M$ : ASSIGNS RSE AND CES.

$A_M$ : REQUESTS S-UNIT TO FETCH, AND CALCULATES AN ADDRESS.

$A_M$ : ASSIGNS RSM DESIGNATED BY RSM_IN_PTR.

RSM_IN_PTR++

$P_E$ : RSE REQUESTS E-UNIT TO ADD.

RELEASES RSE.

DETECTS P_EU_RSM_ID BY COMPARING P_EU_IID AND RSM_IID.

$P_E$ : P_EU_RSM_ID->B_EU_RSM_ID $B_E$ : S-UNIT->LR

B_EU_RSM_ID->U_EU_RSM_ID $X_E$ : E-UNIT SETS LR+0 IN EU RR.

X_EU_RSM_ID->U_EU_RSM_ID $U_E$ : EURR->MDB DESIGNATED BY U_EU_RSM_ID

U  : RELEASES CSE.

U+ : RSM DESIGNATED BY RSM_OUT_PTR->W_TAG

RSM_OUT_PTR->RSM_OUT_PTR_LCH

RSM_OUT_PTR++

W+ : MDB DESIGNATED BY RSM_OUT_PTR_LCH->PSW<0:31>

F I G. 11

4 st flow : PSW<32:63>LOAD

D$_M$ : CANCEL & MALT IFETCH

D$_M$ : ASSIGNS RSE AND CSE.

A$_M$ : REQUESTS S-UNIT TO FETCH, AND CALCULATES AN ADDRESS.

A$_M$ : ASSIGNS RSM DESGNATED BY RSM_IN_PTR.

RSM_IN_PTR++

P$_E$ : RSE REQUESTS E-UNIT TO ADD.

RELEASES RSE.

DETECTS P_EU_RSM_ID BY COMPARING P_EU_IID AND RSM_IID.

P$_E$ : P_EU_RSM_ID->B_EU_RSM_ID

B$_E$ : S-UNIT->LR

B_EU_RSM_ID->X_EU_RSM_ID

X$_E$ : E-UNIT SETS LR+0 TO EU RR.

X_EU_RSM_ID->U_EU_RSM_ID

U$_E$ : EU RR->MDB DESIGNATED BY U_EU_RSM_ID

U  : RELEASES CSE.

U+ : RSM DESIGNATED BY RSM_OUT_PTR->W_TAG

RSM_OUT_PTR->RSM_OUT_PTR_LCH

RSM_OUT_PTR++

W+ : MDB DESIGNATED BY RSM_OUT_PTR_LCH->PSW<32:63>

5 th flow :

W  : RELEASE HALT IFETCH

FIG. 12

1st flow:
  no operation

2st flow:
  no operation

3rd flow : SETS PSW<18:23> IN RUB<2:7>.

$D_M$ : ASSIGNS RSE AND CSE.

$A_M$ : ASSIGNS RSM DESIGNATED BY RSM_IN_PTR.

RSM_IN_PTR++

$T_{MR}$ : PSW<18:23>->MDB<2:7> DESIGNATED BY T_MR_RSM_ID

SETS 0 IN EACH BIT OF MDB<0:1,8:31>.

$P_E$ : RSE REQUESTS E-UNIT TO CALCULATE A LOGICAL SUM AND TO STORE THE RESULT IN RUB.
  RELEASES RSE.
  DETECTS P_EU_RSM_ID BY COMPARING P_EU_IID AND RSM_IID.

$P_E$ : P_EU_RSM_ID->B_EU_RSM_ID $B_E$ : MDB DESIGNATED BY B_EU_RSM_ID->OP1R

B_EU_RSM_ID->X_EU_RSM_ID $X_E$ : E-UNIT SETS THE LOGICAL SUM OF OP1R AND 0 IN EU RR.

X_EU_RSM_ID->U_EU_RSM_ID $U_E$ : EU RR->RUB

U  : RELEASES CSE.

U+ : RSM DESIGNATED BY RSM_OUT_PTR->W_TAG

RSM_OUT_PTR->RSM_OUT_PTR_LCH

RSM_OUT_PTR++

F I G.   1 3

4th flow : REPLACES GR<0:7> WITH RUB<0:7>.

D$_M$ : ASSIGNS RSE AND CSE.

A$_M$ : ASSIGNS RSM DESIGNATED BY RSM_IN_PTR.

RSM_IN_PTR++

P$_E$ : RSE REQUESTS E-UNIT TO MERGE AND TO STORE THE RESULT IN GR.

RELEASES RSE.

DETECTS P_EU_RSM_ID BY COMPARING P_EU_IID AND RSM_IID.

P$_E$ : P_EU_RSM_ID->B_EU_RSM_ID

B$_E$ : RUB->OP1R

GR->OP2R

B_EU_RSM_ID->X_EU_RSM_ID

X$_E$ : E-UNIT SETS OP1R<0:7> AND OP2R<8:31> IN

EU RR<0:7> AND EU RR<8:31>, RESPECTIVELY.

X_EU_RSM_ID->U_EU_RSM_ID

U$_E$ : EU RR->RUB

U   : RELEASES CSE.

U+ : RSM DESIGNATED BY RSM_OUT_PTR->W_TAG

RSM_OUT_PTR->RSM_OUT_PTR_LCH

RSM_OUT_PTR++

W+ : RUB->GR

FIG. 14

INSTRUCTION CONTROL APPARATUS AND METHOD USING MICRO PROGRAM

BACKGROUND OF THE INVENTION

1. Field of the Invention

The present invention relates to an instruction control apparatus for controlling instructions using a micro program ($\mu$ program) in conjunction with an information processing apparatus for sequentially updating/referencing resources (a storage area, register, etc.) accessible from a program in the instruction execution order of the program.

2. Description of the Related Art

A system which is provided with a stack waiting to be processed called a reservation station, for controlling the execution of instructions is well known as a technology for executing instruction processes at high speed in an information processing apparatus. In this system, an out-of-order execution method is adopted, a processible entry in the stack is selected and an instruction is executed as required in an order different from an order designated by a program.

In hardware adopting such an execution method, the decoding of instructions, the operation process in an operation execution unit (E unit), the completion of an instruction execution, etc., are carried out asynchronously. However, in the micro program control of the process of complex instructions, both control synchronized with the operation of an E unit, etc., and an in-order process are needed.

Therefore, in order to perform micro program control in a system adopting an out-of-order execution method, some special mechanism must be provided. However, such a mechanism has not been proposed yet.

SUMMARY OF THE INVENTION

An object of the present invention is to provide an instruction control apparatus for controlling instructions using a micro program, in an information processing apparatus for executing instructions out of order and a method thereof.

In the first aspect of the present invention, the instruction control apparatus comprises a storage device and a control reservation station circuit. The storage device stores a micro program for controlling one or more flows of an instruction process. The control reservation station circuit stores the control information of the micro program for each flow and controls each flow using the control information.

In the second aspect of the present invention, the instruction control apparatus comprises an instruction reservation station circuit and a control reservation station circuit. The instruction reservation station circuit manages an instruction process. The control reservation station circuit stores control information to control the instruction process and controls the instruction process by ouputting control information in synchronization with the instruction process.

BRIEF DESCRIPTION OF THE DRAWINGS

FIG. 1 shows the principle of an instruction control apparatus according to the present invention.

FIG. 8 shows the generation circuit of a P_EU_RSM_ID.

FIG. 9 shows the assignment and release of an RSM.

FIG. 11 shows an example of the first operation (No.1).

FIG. 12 shows an example of the first operation (No.2).

FIG. 13 shows an example of the second operation (No.1).

FIG. 14 shows an example of the second operation (No.2).

DESCRIPTION OF THE PREFERRED EMBODIMENTS

The preferred embodiments according to the present invention is described in detail with reference to the drawings.

FIG. 1 shows the principle of an instruction control apparatus according to the present invention. The instruction control apparatus shown in FIG. 1 comprises a storage device 1, a control reservation station circuit 2 and a data buffer circuit 3. The storage device 1 stores a micro program for controlling one or more flows of an instruction process. The control reservation station circuit 2 stores the control information of the micro program for each flow and controls each flow using the control information.

Generally speaking, an instruction which is controlled by a micro program stored in the storage device 1 often designates a complex process, and includes one or more flows corresponding to one or more pipeline operations. The control reservation station circuit 2 temporarily stores the control information of the micro program corresponding to each flow and controls the operation of each flow by outputting the control information to a control target, such as an E unit, etc., at an appropriate timing. The data buffer circuit 3 temporarily stores data to be used to control each flow and outputs the data to the control target at an appropriate timing.

In this way, the control information of the micro program can be stored corresponding to each flow of a complex instruction process by providing the control reservation station circuit 2. The data used by the micro program can also be stored corresponding to each flow by providing the data buffer circuit 3.

If the out-of-order execution of an instruction is managed by an instruction reservation station, control information can be outputted from the control reservation station circuit 2 to the control target in synchronization with a process of the control target by using a signal transmitted from the control target, thereby enabling instruction control using a micro program.

For example, the storage device 1, control reservation station circuit 2 and data buffer circuit 3 shown in FIG. 1 correspond to an MCS (micro control storage) 42, an RSM (reservation station for micro control) 45 and an MDB (micro data buffer) 47, respectively, shown in FIG. 2 described later.

In the following description, a certain signal and a register for storing the value of the signal are sometimes described with the same nomenclature.

Figure 2:
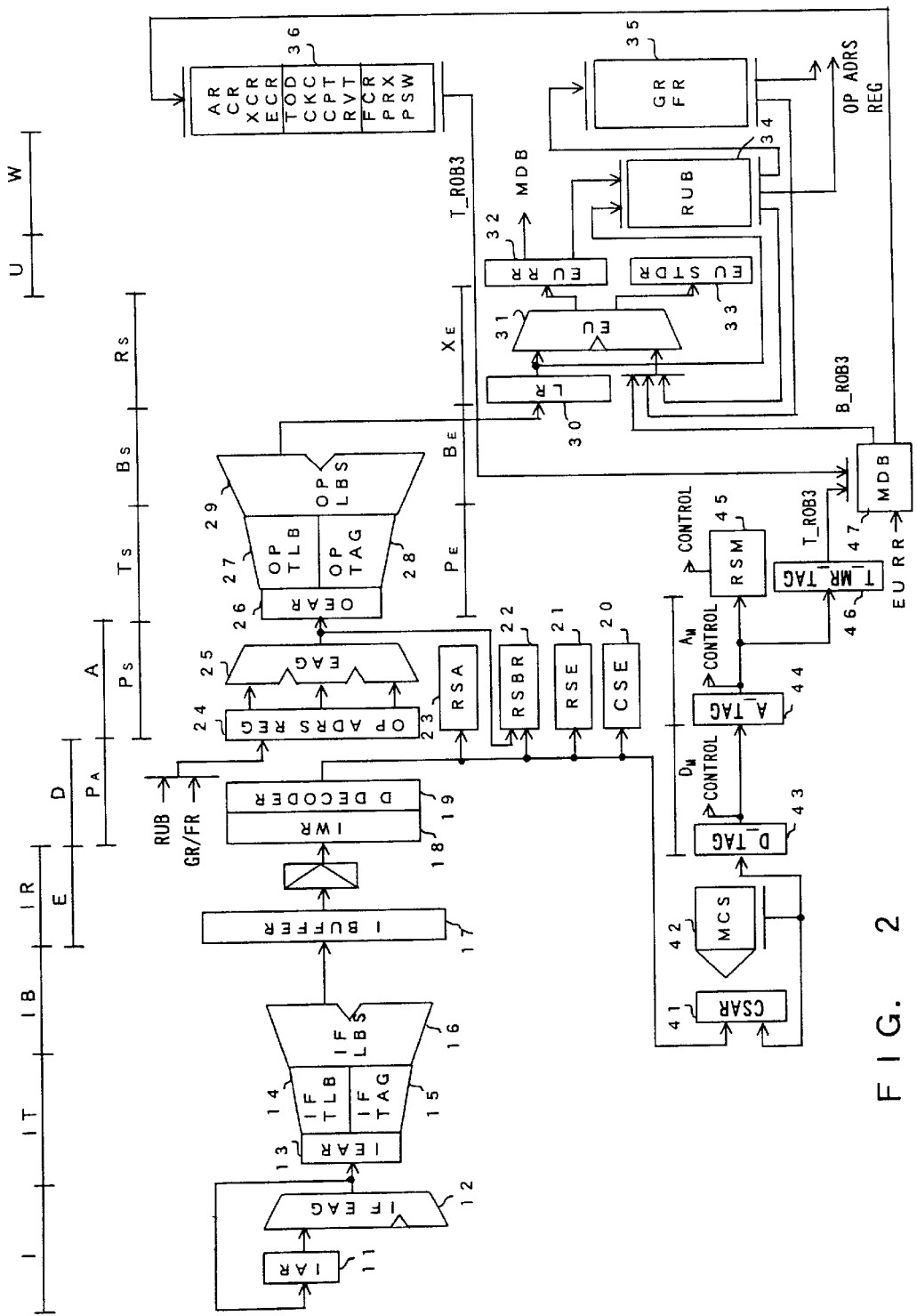
FIG. 2 shows the configuration of an information processing apparatus.

FIG. 2 shows the configuration of an information processing apparatus which comprises an instruction queue reservation station disclosed in an "information processing apparatus" (Japanese Patent Application No. 10-191900), which is a prior application.

In the information processing apparatus shown in FIG. 2, an IAR (instruction address register) 11, an IF EAG (instruction fetch effective address generator) 12, an IEAR (instruction effective address register) 13, an IF TLB (instruction fetch translation lookaside buffer) 14, an IF TAG (instruction fetch tag) 15 and an IF LBS (instruction fetch local buffer storage) 16 perform the pipeline operation of an instruction fetch.

This instruction fetch pipeline is composed of an issuance cycle I of an instruction fetch request, an access cycle IT to a tag and a TLB, a buffer access cycle IB and a fetch completion cycle IR, and an instruction fetched from the main memory using this instruction fetch pipeline is given to an I BUFFER (instruction buffer) 17.

Then, the instruction given to the I BUFFER 17 is decoded by both an IWR (instruction word register) 18 and a D DECODER 19 in the pipeline of an instruction decode. This instruction decode pipeline is composed of the presentation cycle E and decode cycle D of an instruction.

At the time of the completion of the D cycle (D release), an entry is generated in a CSE (commit stack entry) 20 equivalent to the instruction reservation station. At this time, necessary entries are generated in an RSE (reservation station for execution) 21 equivalent to the reservation station for operation, an RSBR (reservation station for branch) 22 equivalent to the reservation station for branch and an RSA (reservation station for address generation) 23 equivalent to the reservation station for a main memory operand address generation.

If there are no empty entries in the reservation stations 21, 22 and 23, the instruction is stored in the IWR 18, and when a required entry becomes empty, a new entry is generated in the CSE 20 and the other required reservation stations. For this purpose, a resource counter is provided corresponding to each of the reservation stations 21, 22 and 23, the value is incremented when an entry is generated, and the value is decremented when a process corresponding to the entry is completed.

The CSE 20 is provided with an in-pointer, and at the completion of a cycle D, the number of the entry generated in the CSE 20 is designated by the value of the in-pointer. This number is also registered in the corresponding entries of other reservation stations as an instruction identifier (IID) and is used to uniquely identify the instruction being processed as well as the instruction execution order. The RSBR 22 is also provided with another in-pointer and an entry is generated in a position indicated by the in-pointer.

Since basically an out-of-order process is performed for the RSE 21 and RSA 23, an empty entry is searched for in the reservation station and an entry is generated.

The CSE 20 is provided with an out-pointer which is incremented when the entry is released, and a leading entry designated by the out-pointer is identified as an instruction in the oldest execution order of instructions which are being executed and are not completed yet. The update of programmable resources (a storage area, register, etc.) which is carried out prior to the release of the entry, is performed in the execution order from the instruction designated by the out-pointer of instructions. In this way, the update order of resources in the execution order of instructions can be guaranteed.

Although the RSBR 22 is similarly provided with an out-pointer, the determination of a branch is an out-of-order process. However, the branch completion report to the CSE 20 is carried out in order from an entry designated by the out-pointer.

Entries in the RSE 21 and RSA 22 are processed in an arbitrary order from an executable entry, and a plurality of executable entries are processed according to the chronological order of instruction execution orders.

In FIG. 2, after the pipeline operation of instruction decoding, the pipeline operation of address calculation, the pipeline operation of memory access by a storage control unit (S unit), the pipeline operation of operation execution and the pipeline operation of resource update are performed as required.

The pipeline operation of address calculation is performed by both an OP ADRS REG (operand address register) 24 and an EAG (effective address generator) 25, and the pipeline is composed of an address generation priority cycle $P_A$ and an address generation cycle A.

The S unit includes an OEAR (operand effective address register) 26, an OP TLB (operand translation lookaside buffer) 27, an OP TAG (operand tag) 28 and an OP LBS (operand local buffer storage) 29. The pipeline of this S unit is composed of a priority cycle $P_S$, an access cycle to tag and TLB $T_S$, a buffer cycle $B_S$ and a completion cycle $R_S$.

The pipeline operation of operation execution is performed by an LR (load register) 30, an EU (execution unit) 31, an EU RR (execution unit result register) 32 and an EU STDR (execution unit store data register) 33, and the pipeline is composed of a priority cycle $P_E$, a buffer access cycle $B_E$, an execution cycle $X_E$ and an update cycle $U_E$. A block including the LR 30, EU 31, EU RR 32 and EU STDR 33 is also sometimes called an E unit.

The pipeline operation of resource update is performed by an RUB (register update buffer) 34, a GR/FR (general purpose register/floating-point register) 35 and a register 36, and the pipeline is composed of an update cycle U and a write cycle W. The values of the GR/FR 35, register 36, etc., are rewritten in this write cycle W, and the data are transferred from the RUB 34 and GR 35 to the OP ADRS REG 24.

In FIG. 2, a CSAR (control storage address register) 41, an MCS (micro control storage) 42, a D_TAG 43, an A_TAG 44, an RSM (reservation station for micro control) 45, a T_MR_TAG (T cycle micro read tag) 46 and an MDB (micro data buffer) 47 perform an operation to control instructions using a micro program in conjunction with the instruction reservation station. The D_TAG 43, A_TAG 44 and T_MR_TAG 46 are registers.

The RSM 45 stores a micro program and information needed for a control by the micro program between a cycle $T_{MR}$ and a cycle U. The MDB 47 temporarily stores data used by the micro program. The entries of the RSM 45 and MDB 47 are generated for each process flow of an instruction.

If in a cycle D, a decoded instruction is judged to be an instruction to be controlled by a micro program, the address of a micro program to control the process of the instruction is set in the CSAR 41 by D DECODER 19. Then, the micro program is read from the MCS 42, and is set in the D_TAG 43 and A_TAG 44 in that order. At this time, control information other than the micro program from the D_TAG 43 is set in the A_TAG 44. In this way, the registration in the RSM 45 of the information set in the A_TAG 44 is reserved.

A part of the information outputted from the D_TAG 43 in a cycle $D_M$ corresponding to a cycle D is used for a variety of controls in the cycle D as a control signal D CONTROL. The control signal D CONTROL is used for the control of, for example, the CSE 20, RSE 21, RSBR 22, RSA 23, etc.

A part of the information outputted from the A_TAG 44 in a cycle $A_M$ corresponding to a cycle A is used for a variety of controls in the cycle A as a control signal A CONTROL. At this time, if there is an empty entry in the RSM 45, the information in the A_TAG 44 is stored in the RSM 45 between a cycle $T_{MR}$ and a cycle U. If there is no empty entry in the RSM 45, the information is stored in the A_TAG 44 until an empty entry is generated.

The information stored in the RSM 45 is read in an arbitrary cycle between a cycle $T_{MR}$ and a cycle U as required, and is used for a variety of controls as a control signal CONTROL.

The T_MR_TAG 46 is provided to read a micro program from a T_ROB3 (T cycle register operand bus 3). Output from the T_MR_TAG 46 is not only used to control instructions, but is also used to transfer specified data (a value designated in the micro program or the operation code of an instruction) to the MDB 47 via the T_ROB3 and to make the EU 31 execute a process using the data.

If a micro program stored in the T_MR_TAG 46 from the A_TAG 44 includes specific data to be transferred to the EU 31, the data are stored in the MDB 47. The MDB 47 also sometimes stores data transferred from the register 36 via the T_ROB3.

In this way, the MDB 47 temporarily stores the data transferred from the T_MR_TAG 46, register 36, etc., and transfers the data to the EU 31 via a B_ROB3 (B cycle register operand bus 3) at an appropriate timing. The MDB 47 also temporarily stores an operation result transferred from the EU RR 32 and writes the data in the register 36 at an appropriate timing.

Next, the structures and operations of the RSM 45 and MDB 47 are described in detail with reference to FIGS. 3 through 8.

Figure 3:
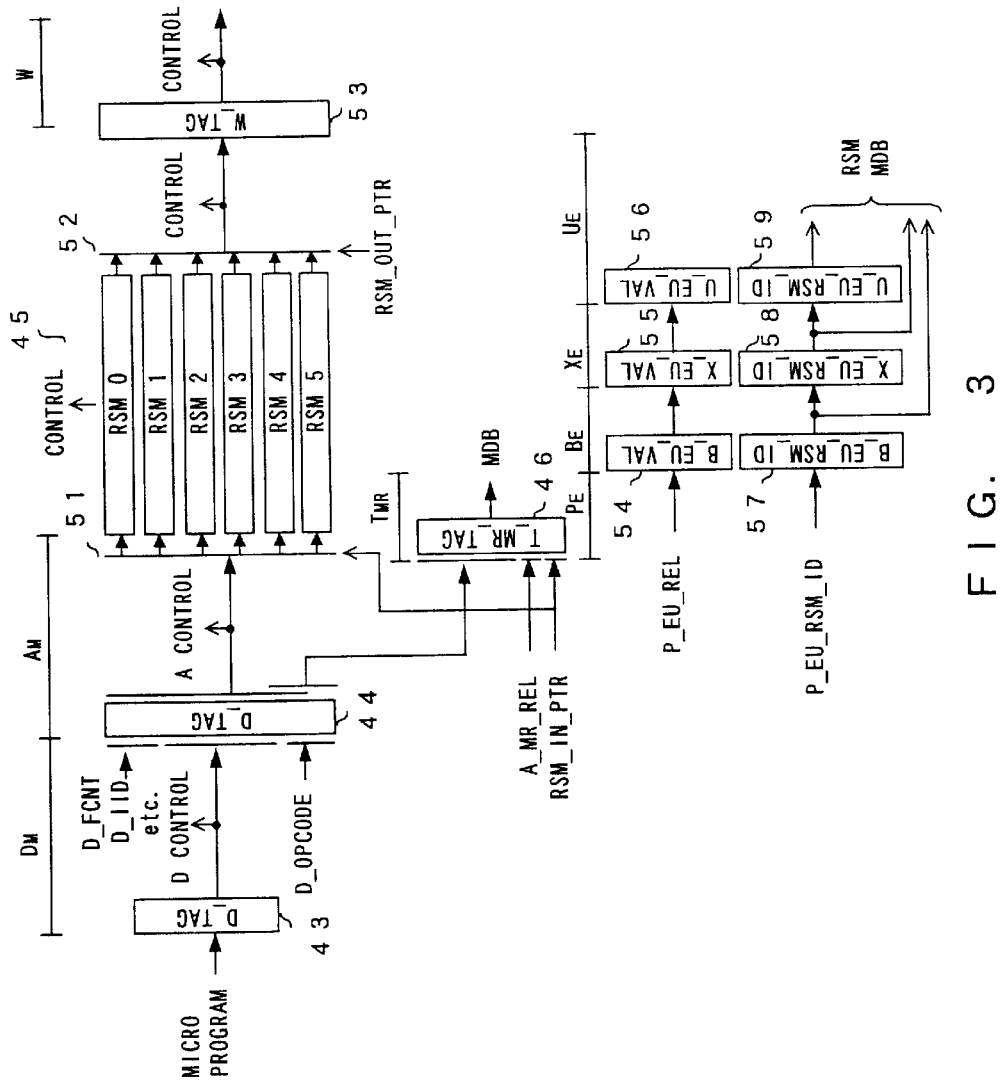
FIG. 3 shows an RSM.

FIG. 3 shows the RSM 45 and the neighboring circuits. In FIG. 3, the RSM 45 includes six entries RSM 0 to RSM 5 and selectors 51 and 52. A register W_TAG 53 is provided on the output side of the selector 52.

In addition to the micro program transferred from the D_TAG 43, the information of a D_FCNT (D flow count), a D_IID, a D_OPCODE (D operation code), etc., is set in the A_TAG 44, and the output is used for a variety of controls in a cycle A. The D_FCNT, D_IID and D_OPCODE indicate the identification number of each flow of a multi-flow instruction requiring a plurality of process flows, the identifier of an entry of the CSE 20 and an operation code, respectively.

The information is written in an entry of the RSM 45 along with the micro program, and is used to manage the correspondence between the entry and the instruction registered in the instruction reservation station.

Writing in the RSM0 through RSM5 is controlled by a signal RSM_IN_PTR (RSM input pointer), and reading from the RSM0 through RSM5 is controlled by a signal RSM_OUT_PTR (RSM output pointer). Both the RSM_IN_PTR and RSM_OUT_PTR indicate the specific entry number of the RSM 45.

The selector 51 selects an entry corresponding to the value of the RSM_IN_PTR from the RSM0 through RSM5 and writes input information. The selector 52 selects an entry corresponding to the value of the RSM_OUT_PTR and reads the stored information. After being temporarily stored in a W_TAG 53, the read information is used for a variety of controls, such as resource update, interruption check, etc. in a cycle W, as a control signal CONTROL.

If the information stored in the RSM 45 is required in each of the cycles $P_E$, $B_E$, $X_E$ and $U_E$ of the E unit, the control signal CONTROL is directly outputted from each entry or the output of the selector 52 itself is used as the control signal CONTROL.

In addition to the information from the A_TAG 44, signals RSM_IN_PTR and A_MR_REL (A cycle micro read release) are inputted to a T_MR_TAG 46. When there is valid information in a cycle $A_M$ and there is an empty entry in the RSM 45, the A_MR_REL becomes logic "1". At this time, the A_MR_REL indicates that a cycle $T_{MR}$ process starts in the next cycle.

If the A_MR_REL becomes logic "1" in a cycle $A_M$, the information of the A_TAG 44 is written in an entry of the RSM 45 designated by the RSM_IN_PTR, and data read from the A_TAG 44 are written in the T_MR_TAG 46. Then, in a cycle $T_{MR}$, the data of the T_MR_TAG 46 are written in the MDB 47.

In the cycle $P_E$ of the E unit, control signals P_EU_REL (P cycle E-UNIT release) and P_EU_RSM_ID (P cycle E-UNIT RSM identifier) are generated, and in each of the cycles $B_E$, $X_E$ and $U_E$, a control signal EU_VAL corresponding to the value of the P_EU_REL and a control signal EU_RSM_ID corresponding to the value of the P_EU_RSM_ID are stored.

The P_EU_REL indicates that the $B_E$ cycle process of the E unit starts in the next cycle. The P_EU_RSM_ID indicates the entry number of the RSM 45 in which control information of an instruction to be processed by the E unit is stored.

A B_EU_VAL 54, an X_EU_VAL 55 and a U_EU_VAL 56 are registers for storing the EU_VAL, a B_EU_RSM_ID 57, an X_EU_RSM_ID 58 and a U_EU_RSM_ID 59 are registers for storing the EU_RSM_ID.

In each of the cycles $B_E$, $X_E$ and $U_E$, the EU_VAL is stored in the B_EU_VAL 54, X_EU_VAL 55 and U_EU_VAL 56, respectively, and indicate that the E unit is executing a process in a corresponding cycle.

In each of the cycles $B_E$, $X_E$ and $U_E$, the EU_RSM_ID is stored in a B_EU_RSM_ID 57, an X_EU_RSM_ID 58 and a U_EU_RSM_ID 59, respectively, and indicate the entry number of the RSM 45 in which control information of an instruction to be processed by the E unit is stored. These EU_RSM_IDs are outputted to both the RSM 45 and MDB 47 at the timing of a corresponding EU_VAL and are used for read/write control.

In this way, both the RSM 45 and MDB 47 can be controlled in synchronization with the timing of each process stage of the E unit by providing a register for storing the identification information of the entry of the RSM 45 in which control information of an instruction being processed at each stage of the E unit. In the RSM 45, control information, such as a micro program, etc., can be outputted as a CONTROL in synchronization with the process of the E unit. The control of the MDB 47 is described later.

Figure 4:
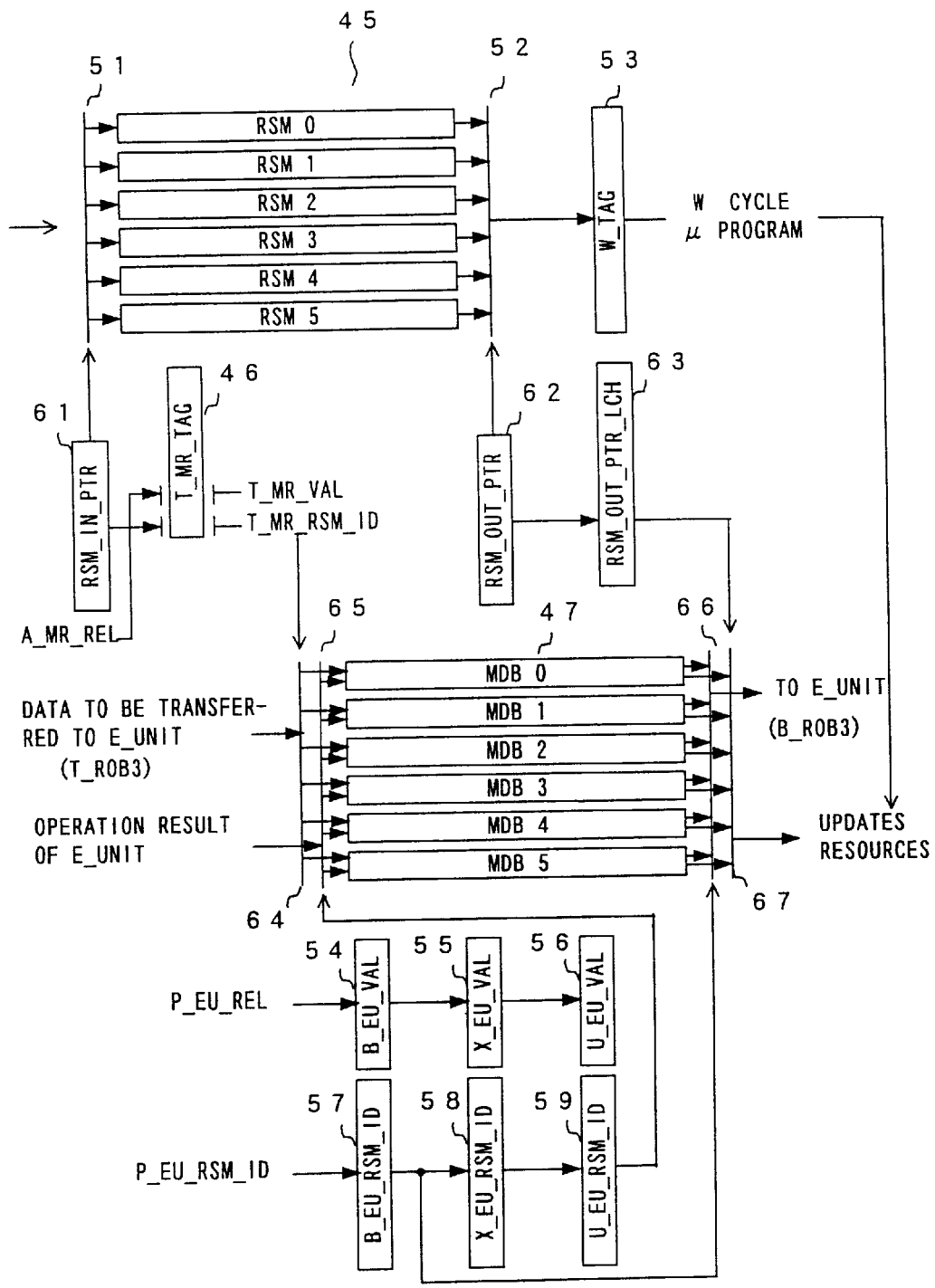
FIG. 4 shows a relationship between an RSM and an MDB.

Next, FIG. 4 shows the RSM 45 and MDB 47 and the neighboring circuits. In FIG. 4, an RSM_IN_PTR 61 and an RSM_OUT_PTR 62 are registers for storing the values of the RSM_IN_PTR and RSM_OUT_PTR, respectively, and an RSM_OUT_PTR_LCH 63 is a latch circuit for storing the value of the RSM_OUT_PTR.

The MDB 47 includes six entries MDB 0 through MDB5 corresponding to six entries of the RSM 45, and further includes selectors 64, 65, 66 and 67. The RSM0 through RSM5 and MDB0 through MDB5 are matched one to one, and data to be used by a micro program stored in an RSMi (i=0, 1, 2, 3, 4 and 5) are stored in an MDBi.

Writing in the MDB0 through MDB5 is controlled by signals T_MR_VAL and T_MR_RSM_ID from the T_MR_TAG 46, and U_EU_RSM_ID 59, and reading from the MDB0 through MDB5 is controlled by the B_EU_RSM_ID 57 and RSM_OUT_PTR_LCH 63.

The T_MR_TAG 46 stores both a part of a micro program and an operation code as data in addition to the T_MR_VAL and T_MR_RSM_ID. Whether to transmit these data to the T_ROB3 is designated in advance by the micro program.

The selector 64 receives data to be transferred to the E unit from the T_ROB3, selects an entry corresponding to the value of the T_MR_RSM_ID at a timing designated by the T_MR_VAL in a cycle $T_{MR}$ and writes the data in the entry. The selector 65 selects an entry corresponding to the value of the U_EU_RSM_ID 59 at a timing designated by the U_EU_VAL 56 in a cycle $U_E$, and writes the operation result of the E unit in the entry.

Data written in the MDB 47 in a cycle $T_{MR}$ are read in a cycle $B_E$, and are transmitted to the E unit as an operand. At this time, the selector 66 selects an entry corresponding to the value of the B_EU_RSM_ID 57 at a timing designated by the B_EU_VAL 54, and reads data stored in the entry.

Data written in the MDB 47 in a cycle $U_E$ are read in a cycle W, and are used to update resources. At this time, the selector 67 selects an entry corresponding to the value of the RSM_OUT_PTR_LCH 63 and reads data stored in the entry.

Figure 5:
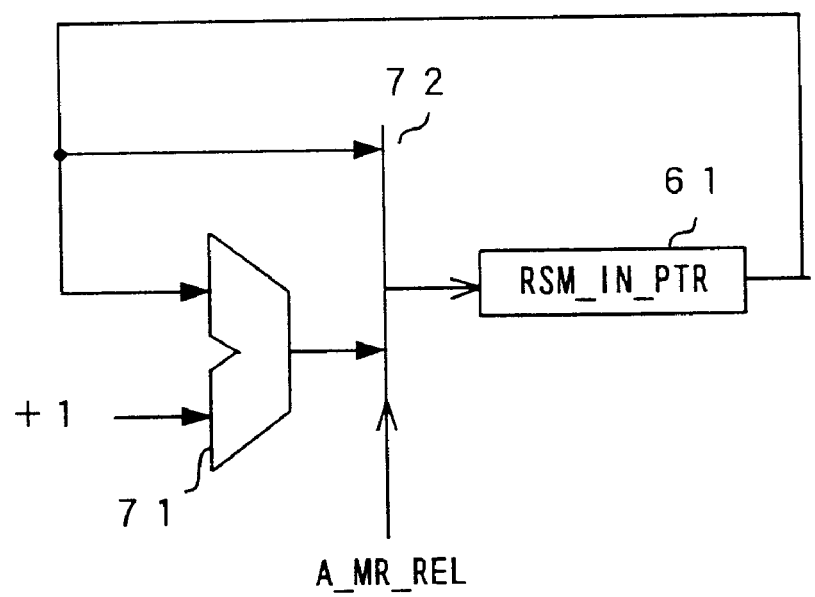
FIG. 5 shows the control circuit of an RSM_IN_PTR.
Figure 6:
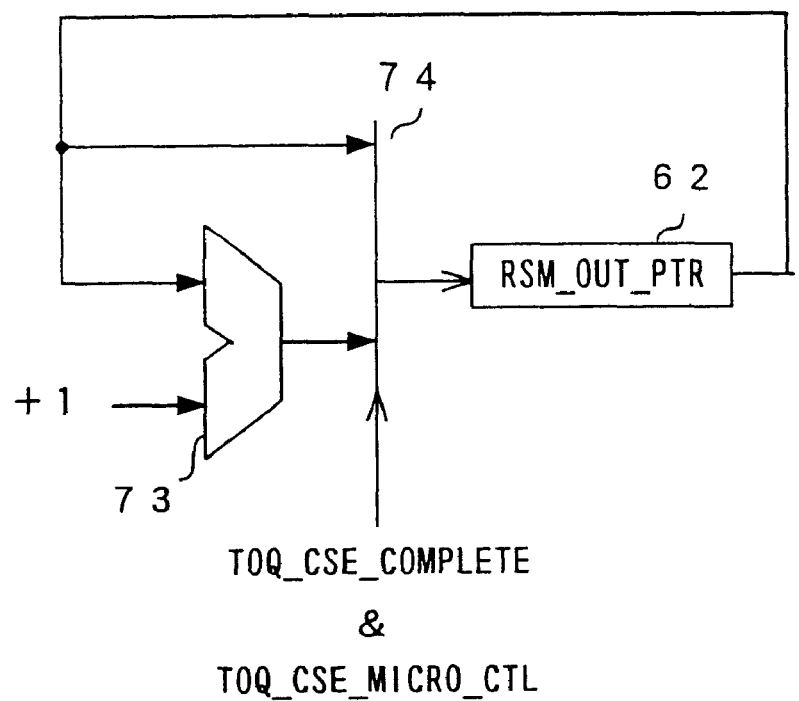
FIG. 6 shows the control circuit of an RSM_OUT_PTR.

By the way, the values of the RSM_IN_PTR 61 and RSM_OUT_PTR 62 are updated by control circuits shown in FIGS. 5 and 6, respectively. In FIG. 5, an adder 71 adds 1 to the value inputted from the RSM_IN_PTR 61. If an A_MR_REL becomes logic "1", the selector 72 selects the value inputted from the adder 71, and if the A_MR_REL becomes logic "0", the selector 72 selects the value inputted from the RSM_IN_PTR 61. Therefore, when the A_MR_REL becomes logic "1", the value of the RSM_IN_PTR 61 is incremented.

In FIG. 6, an adder 73 adds 1 to the value inputted from the RSM_OUT_PTR 62. If the logical product of a signal TOQ_CSE_COMPLETE (top of queue commit stack entry complete) and a signal TOQ_CSE_MICRO_CTL (top of queue commit stack entry micro control) outputted from the CSE 20 becomes logic "1", the selector 74 selects the value inputted from the adder 73, and if the logical product becomes logic "0", the selector 74 selects the value inputted from the RSM_OUR_PTR 62.

When the flow process of an instruction stored in the leading entry of the CSE 20 is completed, the TOQ_CSE_COMPLETE becomes logic "1". If the flow of the instruction stored in the leading entry of the CSE 20 is to be controlled by a micro program, the TOQ_CSE_MICRO_CTL becomes logic "1".

Therefore, when the flow process of the instruction controlled by a micro program is completed, the logical product of the TOQ_CSE_COMPLETE and TOQ_CSE_MICRO_CTL becomes logic "1", and the value of the RSM_OUT_PTR 62 is incremented.

Figure 7:
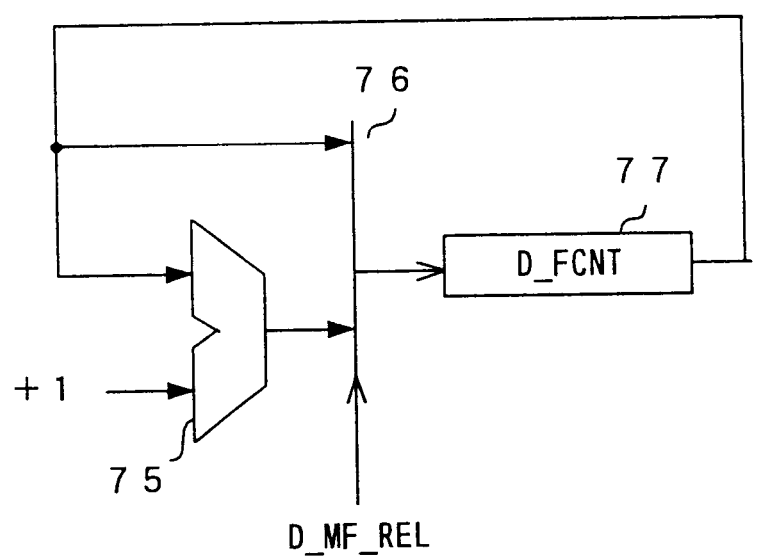
FIG. 7 shows the control circuit of a D_FCNT.

The D_FCNT shown in FIG. 3 is generated/updated by a control circuit as shown in FIG. 7. In FIG. 7, an adder 75 adds 1 to the value inputted from the register D_FCNT 77. If a signal D_MF_REL (D cycle multi-flow release) becomes logic "1", the selector 76 selects the value inputted from the adder 75, and if the D_MF_REL becomes logic "0", the selector 76 selects the value inputted from the D_FCNT 77.

When a D cycle is completed in each process flow of the instruction controlled by a micro program, the D_MF_REL becomes logic "1". Therefore, the value of the D_FCNT 77 is incremented for each process flow. However, in the case of a single-flow instruction processed in one process flow, the D_MF_REL is not used, and the value of the D_FCNT 77 always remains 1.

The value of this D_FCNT 77 is stored in the A_TAG 44, RSM 45 and W_TAG 53 in that order along with control information, and is used if control over a specific flow is required.

The P_EU_RSM_ID shown in FIG. 3 is generated by a circuit as shown in FIG. 8. The circuit shown in FIG. 8 includes six NXOR circuits 81 and six AND circuits 82 corresponding to the six entries of the RSM 45, and an encoder 83.

Both a P_EU_IID of four bits and an RSMi_IID (i=0, 1, 2, 3, 4 and 5) of four bits are inputted to each NXOR circuit 81, the values are compared for each bit of <0:3> and the comparison result is outputted. At this time, if the two corresponding bit values of the P_EU_IID and RSMi_IID are the same, the comparison result becomes logic "1".

The P_EU_IID indicates the instruction identifier of an instruction with a cycle $P_E$ process started by the E unit, and the RSMi_IID indicates the instruction identifier stored in the entry RSMi of the RSM 45. Therefore, if the process of an instruction corresponding to the instruction identifier stored in the entry RSMi is started in the E unit, all the outputs of four bits of the NXOR circuits 81 become logic "1".

Then, the AND circuit 82 outputs the logical product of the outputs from the NXOR circuit 81 and an RSMi_VALID as a P_EU_RSMi_OPERATION. In this case, if the information of RSMi is valid, the RSMi_VALID becomes logic "1", and if all the inputs of the AND circuits 82 are logic "1", the P_EU_RSMi_OPERATION becomes "1". In this case, the P_EU_RSMi_OPERATION indicates that the control information of an instruction being processed in the E unit is stored in the RSMi.

The encoder 83 encodes six signals P_EU_RSM0_OPERATION through P_EU_RSM5_OPERATION and generates a P_EU_RSM_ID. The P_EU_RSM_ID generated in this way indicates the entry number of the entry in the RSM 45 in which the control information of the instruction being processed in the E unit is stored.

In this way, the identification information of an entry in which the control information of the instruction is stored can be obtained by comparing the instruction identifier stored in each entry of the RSM 45 with the instruction identifier of the instruction of which process is started by the E unit. Then, according to the obtained identification information, necessary information can be read from the RSM 45. By using this identification information, the entry of the MDB 47 corresponding to the entry of the RSM 45 can be identified, necessary information can be read from the entry and the operation result can be stored in the entry.

The RSM 45 has a ring buffer structure as shown in FIG. 9, and the assignment and release of each entry are carried out in order, as shown by dotted-line arrows.

First, an entry designated by the value of the RSM_IN_PTR 61 is assigned at the timing of an A_MR_REL, and information transferred from a cycle $A_M$ is set in the entry.

Then, an entry designated by the RSM_OUT_PTR is released at the timing of a TOQ_CSE_COMPLETE and TOQ_CSE_MICRO_CTL, and the information of the entry is transferred to a W cycle. Therefore, both the release of the entry of RSM 45 and the update of resources are carried out in synchronization with a corresponding instruction completion report from an instruction reservation station. If control information is required in a cycle preceeding the cycle W, the information is directly outputted without releasing the entry of the RSM 45, as shown in FIG. 3.

Figure 10:
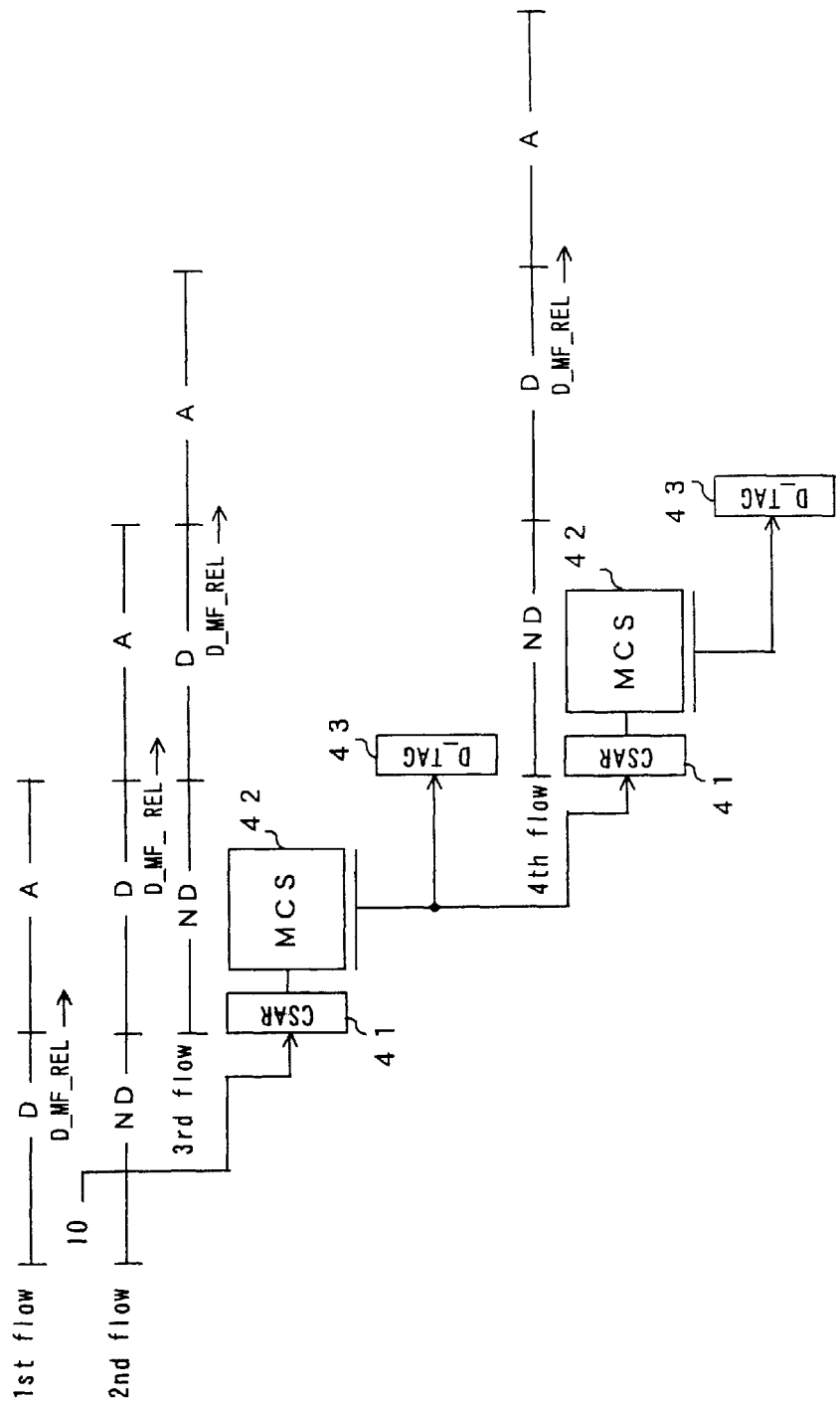
FIG. 10 shows each flow of an instruction.

Generally speaking, a plurality of process flows are performed under the control of an instruction of a micro program, as shown in FIG. 10. In each flow shown in FIG. 10, ND, D and A indicate a cycle prior to decoding, a decode cycle and an address calculation cycle, respectively, and a D_MF_REL indicates the termination timing of a cycle D.

In the cycle D of the first flow, an instruction is decoded, and the address IO of a micro program is set in a CSAR 41. The second flow corresponds to a process to wait for an address calculation until all other address calculations are completed and the RSA 23 shown in FIG. 2 becomes empty.

In the cycle ND of the third flow, the micro program is read from an MCS 42 and is set in a D_TAG 43. Simultaneously, the next address is set in the CSAR 41. Then, in cycles D and A, operations corresponding to $D_M$ and $A_M$ cycles, respectively, shown in FIG. 2 are performed. The same process as that in the third flow is performed in the fourth and subsequent flows.

Next, a specific example of instruction control by a micro program is described with reference to FIGS. 11 through 14.

FIGS. 11 and 12 show the process flows of an LPSW (Load Program Status Word) instruction. In this example, control is exercised by five flows, and a resource is updated by the operation result of the E unit using the MDB 47. The resource to be updated is the PSW (64 bits) of the register 36 shown in FIG. 2. Cycle names with "+" attached in each flow indicate a timing in the impending termination of the cycle. For example, U+ indicates the impending termination of a U cycle.

First, in the first and second flows shown in FIG. 11, no operation is performed, and in the third flow, the bits <0:31> of the PSW are loaded with data.

In this example, in a cycle $D_M$, the entries of the CSE20 and RSE 21 are assigned. Then, in a cycle $A_M$, an address calculation is performed, a fetch request is issued to the S unit, the entry of the RSM 45 designated by the RSM_IN_PTR 61 is assigned and the value of the RSM_IN_PTR 61 is incremented.

Then, in a cycle $P_E$, an add request is issued from the RSM 21 to the E unit, and the entry of the RSE 21 is released. By the circuit shown in FIG. 8, it the P_EU_RSM_ID is detected and is set in a B_EU_RSM_ID 57.

Then, in a cycle $B_E$, an operand from the S unit is set in an LR 30, and the value of the B_EU_RSM_ID 57 is set in an X_EU_RSM_ID 58.

Then, in a cycle $X_E$, the E unit adds 0 to the value of the LR 30, and sets the addition result in an EU RR 32. The value of the X_EU_RSM_ID 58 is set in a U_EU_RSM_ID 59.

Then, in a cycle $U_E$, the value of the EU RR 32 is set in the entry of the MDB 47 designated by the value of the U_EU_RSM_ID 59. In a cycle U, the process completion is judged, and the entry of the CSE 20 is released. Then, in a cycle U+, the information of the entry of the RSM 45 designated by the RSM_OUT_PTR 62 is set in a W_TAG 53. The value of the RSM_OUT_PTR 62 is set in an RSM_OUT_PTR_LCH 63, and the value of the RSM_OUT_PTR 62 is incremented.

Then, in a cycle W, the data of the entry of the MDB 47 designated by the RSM_OUT_PTR_LCH 63 are set in PSW<0:31>.

Then, in the fourth flow shown in FIG. 12, PSW<32:63> is loaded with the data. A process in the fourth flow is basically the same as the process in the third flow. However, since the update of the PSW<32:63> corresponds to the rewrite of an address of a program in process, the instruction fetch should be temporarily stopped.

Under these conditions, in a cycle $D_M$, the instruction fetch is stopped, and the processes of instructions which have already been fetched are cancelled. Then, the same process as the process in the third flow is performed, and in a cycle W, the data of the MDB 47 are set in the bits <32:63> of the PSW.

Then, in the fifth flow, the instruction fetch is re-started, and a process based on the updated PSW is performed.

FIGS. 13 and 14 show the process flows of an IPM (Insert Program Mask) instruction. In this example, control is exercised by four flows, and data are transferred to the E unit using the MDB 47. According to the instruction of the MDB 47, the bits <18:23> of the PSW is set in the bits <2:7> of a GR 35. At this time, the values of the bits <0:1> of the GR 35 become 0, and the bits <8:31> remain unchanged.

First, in the first and second flows shown in FIG. 13, no operation is performed, and in the third flow, data in the bits <18:23> of the PSW are set in the bits <2:7> of the RUB 34.

In this example, in a cycle $D_M$, the entries of CSE 20 and RSE 21 are assigned. Then, in a cycle $A_M$, the entry of the RSM 45 designated by the RSM_IN_PTR 61 is assigned and the value of the RSM_IN_PTR 61 is incremented.

Then, in a cycle $T_{MR}$, the data of the bits <18:23> of the PSW are set in the bits <2:7> of the entry of the MDB 47 designated by the T_MR_RSM_ID, and 0 is set in the bits <0:1, 8:31> of the entry.

Then, in a cycle $P_E$, a request to perform a logical sum operation and to store the result in the RUB 34 is sent from the RSE 21 to the E unit, and the entry of the RSE 21 is released. By the circuit shown in FIG. 8, the P_EU_RSM_ID is detected and is set in the B_EU_RSM_ID 57.

Although in this example, the cycles $T_{MR}$ and $P_E$ are different, the cycles $T_{MR}$ and $P_E$ are sometimes synchronized. Alternatively, the interval between the cycles $T_{MR}$ and $P_E$ sometimes becomes one or more cycles.

Then, in a cycle $B_E$, the data of the entry of the MDB 47 designated by the B_EU_RSM_ID 57 are set in the OP1R (operand 1 register) of the E unit, and the value of the B_EU_RSM_ID 57 is set in an X_EU_RSM_ID 58.

Then, in a cycle $X_E$, the E unit calculates the logical sum of the value of the OP1R and 0, and the operation result is set in an EU0RR. The value of the X_EU_RSM_ID 58 is set in a U_EU_RSM_ID 59.

Then, in a cycle $U_E$, the data of the EU RR 32 are set in the RUB 34. In a cycle U, the process completion is judged, and the entry of the CSE 20 is released. Then, in a cycle U+, the information of the entry of the RSM 45 designated by the RSM_OUT_PTR 62 is set in a W_TAG 53. The value of the RSM_OUT_PTR 62 is set in an RSM_OUT_PTR_LCH 63, and the value of the RSM_OUT_PTR 62 is incremented.

Then, in the fourth flow shown in FIG. 14, the bits <0:7> of the GR 35 is replaced with the bits <0:7> of the RUB 34.

In this example, in a cycle $D_M$, the entries of the CSE 20 and RSE 21 are assigned. In a cycle $A_M$, the entry of the RSM 45 designated by the RSM_IN_PTR 61 is assigned, and the value of the RSM_IN_PTR 61 is incremented.

Then, in a cycle $P_E$, a request to perform a merge and to store the result in the GR 35 is sent from the RSE 21 to the E unit, and the entry of the RSE 21 is released. By the circuit shown in FIG. 8, the P_EU_RSM_ID is detected and is set in the B_EU_RSM_ID 57.

Then, in a cycle $B_E$, the data of the RUB 34 and the data of the GR 35 are set in the OP1R and the OP2R (operand 2 register), respectively. The value of the B_EU_RSM_ID 57 is set in the X_EU_RSM_ID 58.

Then, in a cycle $X_E$, the E unit sets the bits <0:7> of the OP1R and the bits <8:31> of the OP2R in the bits <0:7> and <8:31> of the EU RR 32, respectively. The value of the X_EU_RSM_ID 58 is set in the U_EU_RSM_ID 59.

Then, in a cycle $U_E$, the data of the EU_RR 32 are set in the RUB 34. In a cycle U, the process completion is judged, and the entry of the CSE 20 is released. Then, in a cycle U+, the information of the entry of the RSM 45 designated by the RSM_OUT_PTR 62 is set in the W_TAG 53. The value of the RSM_OUT_PTR 62 is set in the RSM_OUT_PTR_LCH 63, and the value of the RSM_OUT_PTR 62 is incremented.

Then, in a cycle W, the data of the RUB 34 are set in the GR 35, and the data of the GR 35 are updated.

Although in these examples, the cycles $U_E$ and U are different, the cycles $U_E$ and U are sometimes synchronized. Alternatively, the interval between the cycles $U_E$ and U is sometimes one or more cycles.

Although in the above-described preferred embodiments, instruction control in an information processing apparatus including an instruction reservation station which is disclosed in the prior Japanese Patent Application No. 10-191900, is described, an arbitrary device can be used as the instruction reservation station. For the number of entries of the RSM 45 and MDB 47, an arbitrary number can also be adopted.

According to the present invention, in an information processing apparatus for executing instructions out of order, the control information of a micro program and data to be used in the control can be outputted to a control target in synchronization with the instruction process, and the instructions can be controlled using a micro program.

What is claimed is:

1. An instruction control apparatus, comprising:

a storage device storing a micro program for controlling one or more flows of an instruction process; and a control reservation station circuit storing control information of the micro program for each flow including an operation execution pipeline of an operation execution unit, outputting the control information to the operation execution pipeline in synchronization with a process at each stage of the operation execution pipeline, and controlling an operation of the operation execution pipeline of each flow using the control information.

2. The instruction control apparatus according to claim 1, wherein when an instruction is decoded and it is found that the decoded instruction can be controlled by the micro program, said control reservation station circuit stores one piece of control information as an entry for each flow of the decoded instruction.

3. The instruction control apparatus according to claim 1, further comprising a reservation circuit making a reservation to store the control information in an entry of said control reservation station circuit, when an instruction is decoded and it is found that the decoded instruction can be controlled by the micro program, said reservation circuit making a reservation to store one piece of control information as an entry for each flow of the decoded instruction.

4. The instruction control apparatus according to claim 1, further comprising a register circuit storing identification information of an entry which stores control information of an instruction corresponding to each stage of the operation execution pipeline, of one or more entries of said control reservation station circuit, for each stage, said control reservation station circuit outputting control information of an instruction corresponding to each stage, based on identification information of the register circuit.

5. The instruction control apparatus according to claim 1, wherein said control reservation station circuit stores identification information for identifying an instruction along with the control information, said instruction control apparatus further comprising a generation circuit comparing the identification information with identification information of an instruction with a process started in the operation execution pipeline, and generating identification information of an entry which stores control information of the instruction, of one or more entries of said control reservation station circuit.

6. The instruction control apparatus according to claim 1, further comprising a data buffer circuit storing data to be used to control each flow by said control reservation station circuit.

7. The instruction control apparatus according to claim 6, further comprising a pointer circuit matching each entry of said control reservation station circuit with each entry of said data buffer circuit.

8. The instruction control apparatus according to claim 6, wherein said data buffer circuit operates in synchronization with a process at each stage of the operation execution pipeline.

9. The instruction control apparatus according to claim 8, further comprising a register circuit storing identification information of an entry corresponding to each stage of the operation execution pipeline, of one or more entries of said data buffer circuit, for each stage, said data buffer circuit performing one of a storing operation and an outputting operation for data corresponding to each stage based on identification information of the register circuit.

10. The instruction control apparatus according to claim 8, wherein said data buffer circuit stores an operation result in synchronization with a completion of an operation in the operation execution pipeline.

11. The instruction control apparatus according to claim 6, wherein said control reservation station circuit outputs the control information in synchronization with an instruction completion signal from an instruction reservation station, and the control information controls an operation to update a programmable resource using data stored in said data buffer circuit.

12. An instruction control apparatus, comprising:

an instruction reservation station circuit managing an instruction process; and a control reservation station circuit storing control information to control the instruction process at each stage of the operation execution pipeline of an operation execution unit, outputting the control information to the operation execution pipeline in synchronization with the instruction process and controlling the instruction process of the operation execution pipeline using the control information.

13. An instruction control method, comprising:

managing an instruction process using both a micro program to control one or more flows of an instruction process and an instruction reservation station;

storing control information of the micro program in a control reservation station for each flow including an operation execution pipeline of an operation execution unit;

outputting the control information from the control reservation station to the operation execution pipeline in synchronization with a process at each stage of the operation execution pipeline; and controlling an operation of the operation execution pipeline of each flow using the control information.

14. An instruction control apparatus, comprising:

storage means for storing a micro program to control one or more flows of an instruction process; and control reservation station means for storing control information of the micro program for each flow including an operation execution pipeline of an operation execution unit, outputting the control information to the operation execution pipeline in synchronization with a process at each stage of the operation execution pipeline, and controlling an operation of the operation execution pipeline of each flow using the control information.

15. An instruction control apparatus, comprising:

instruction reservation station means for managing an instruction process; and control reservation station means for storing control information to control the instruction process at each stare of the operation execution pipeline of an operation execution unit, outputting the control information to the operation execution pipeline in synchronization with the instruction process and controlling the instruction process of the operation execution pipeline using the control information.

\* \* \* \* \*

UNITED STATES PATENT AND TRADEMARK OFFICE
CERTIFICATE OF CORRECTION

PATENT NO. : 6,789,185 B1
DATED : September 7, 2004
INVENTOR(S) : Norihito Gomyo et al.

Page 1 of 1

It is certified that error appears in the above-identified patent and that said Letters Patent is hereby corrected as shown below:

Drawings,
Fig. 1, change "MAICRO" to -- MICRO --.

Column 14,
Line 18, change "stare" to -- stage --.

Signed and Sealed this

Twenty-fifth Day of January, 2005

JON W. DUDAS
*Director of the United States Patent and Trademark Office*